United States Patent [19]

Stenzel et al.

[11] 4,143,121

[45] Mar. 6, 1979

[54] CONTINUOUS PRODUCTION OF PURE PHOSPHINE

[75] Inventors: Jürgen Stenzel; Gero Heymer; Christian May, all of Erfstadt-Liblar, Fed. Rep. of Germany

[73] Assignee: Hoechst Aktiengesellschaft, Frankfurt am Main, Fed. Rep. of Germany

[21] Appl. No.: 815,161

[22] Filed: Jul. 13, 1977

[30] Foreign Application Priority Data

Jul. 17, 1976 [DE] Fed. Rep. of Germany ....... 2632316

[51] Int. Cl.² .............................................. C01B 25/00
[52] U.S. Cl. .................................................... 423/299
[58] Field of Search ......................................... 423/299

[56] References Cited

U.S. PATENT DOCUMENTS 2,977,192  3/1961  Cummins ............................ 423/299

*Primary Examiner*—O. R. Vertiz
*Assistant Examiner*—Gregory A. Heller
*Attorney, Agent, or Firm*—Connolly and Hutz

[57] ABSTRACT

Phosphine is continuously produced by reacting yellow phosphorus with an aqueous alkali metal hydroxide solution in the presence of an alcohol, with the exclusion of oxygen, at 44 to 90° C. To this end, the reaction is effected in two separate reaction stages. In the first reaction stage, the alkali metal hydroxide solution and phosphorus are reacted with agitation in a molar ratio of 0.7:1 to 0.9:1 and the resulting gaseous phosphine is collected. Resulting liquid phase material containing unreacted phosphorus is delivered to the second reaction stage in which the unreacted phosphorus is reacted with further aqueous alkali metal hydroxide solution. The resulting gaseous reaction products are collected separately from the gaseous phosphine collected in the first reaction stage.

9 Claims, No Drawings

CONTINUOUS PRODUCTION OF PURE PHOSPHINE

This invention relates to the continuous production of phosphine by reacting yellow phosphorus with an aqueous alkali metal hydroxide solution in the presence of an alcohol, with the exclusion of oxygen.

Phosphine is an important starting material for making a variety of organophosphorus compounds, flame-proofing agents and pharmaceutical preparations.

German Patent No. 1,112,722 describes a process wherein yellow phosphorus is reduced to phosphine by means of electrolytically generated hydrogen. A disadvantage encountered in connection therewith resides in the need to separate the electrode-surrounding regions from each other by means of a ceramic diaphragm, which raises a problem in respect of the particular material to be used, and whereby the electrolytic efficiency is impaired. In addition to this, the resulting phosphine is obtained together with hydrogen and badly contaminated therewith.

As disclosed in U.K. Patent Specification No. 990,918 German Pat. No. 1,219,911 and U.S. Pat. No. 3,371,994, phosphorus in an acid medium undergoes a disproportionation reaction with the resultant formation of phosphoric acid and phosphine.

The processes just described are, however, disadvantageous in respect of the following points. Experiments have shown that high temperatures (higher than 250° C.), at which substantially all reactor materials undergo serious corrosion in contact with concentrated phosphoric acid, are necessary to initiate the reaction. In addition to this, it is necessary, in a reaction which proceeds very reluctantly, to convert the initial yellow phosphorus to red phosphorus and to then subject the latter to disproportionation at low reaction velocity. Furthermore, only small space-time yields are obtained.

Yellow phosphorus which is subjected to disproportionation in an alkaline medium gives phosphine and hypophosphite.

U.S. Pat. No. 2,977,192, for example, describes a process wherein yellow phosphorus is reacted in the presence of an alcohol with aqueous sodium hydroxide solution at 44° to 90° C. in accordance with the following equation:

$$P_4 + 3 NaOH + 3 H_2O \rightarrow PH_3 + 3 NaH_2PO_2$$

This prior process yields mixtures of phosphine and hydrogen, however, of which the composition varies continually, especially high proportions of hydrogen being encountered at the start and end of the reaction. As can be inferred from this, interfering reactions take place during this operation.

The marked variation in the phosphine content of the gaseous product is a serious disadvantage of the above prior process inasmuch as highly concentrated phosphine (more than 90% by volume of $PH_3$) is required to be used in many chemical reactions. To produce this highly concentrated phosphine from a phosphine-containing gas stream which varies significantly in composition, it has heretofore been necessary to employ elaborate and expensive equipment (condensation facilities operating at −120° C., membrane diffusion facilities, and the like).

Needless to say, a continually varying phosphine concentration seriously complicates all those reactions which call for a metered supply of constant quantities of phosphine.

The variations in the composition of the gas could in fact be reduced if several phosphine production units were operated in parallel and in chronological sequence, or if the reactants were supplied continuously (cf. U.S. Pat. No. 2,977,192), but the phosphine concentration would nevertheless invariably remain at intermediate values, i.e. at 50 to 85% of $PH_3$.

It is accordingly an object of the present invention to provide a process permitting the continuous production of highly concentrated phosphine whose composition is subject to substantially no significant variations.

The present invention now unexpectedly provides a process for the continuous production of phosphine by reacting yellow phosphorus with an aqueous alkali metal hydroxide solution in the presence of an alcohol, with the exclusion of oxygen, at 44° to 90° C., the phosphorus and alkali metal hydroxide solution being introduced separately from one another, and the reaction being effected in two separate reaction stages, wherein, in the first reaction stage, the alkali metal hydroxide solution and phosphorus are reacted with agitation in a molar ratio of 0.7:1 to 0.9:1, the resulting gaseous phosphine is collected, and the resulting liquid phase material containing unreacted phosphorus is concurrently delivered to the second reaction stage; and, in the second reaction stage, the said unreacted phosphorus is reacted with further aqueous alkali metal hydroxide and the resulting gaseous reaction products are collected separately from the gaseous phosphine collected in the first reaction stage.

This process permits the continuous production, in the first reaction stage, of a gaseous product having a phosphine content of 94 to 98% by volume.

The gaseous reaction products which are produced in the second reaction stage, and which are collected separately from the gaseous phosphine produced in the first reaction stage, comprise products of a "commercial" grade.

Preferred features of the present process provide:
(a) for 100 to 2000 ml of alcohol to be used per mol of phosphorus;
(b) for the aqueous alkali metal hydroxide solution used to have a concentration of 50 to 80 weight %;
(c) for the aqueous alkali metal hydroxide solution used to be an alcoholic aqueous alkali metal hydroxide solution containing 0.5 to 2.2 mols of water per mol of alkali metal hydroxide;
(d) for the alcohol used to be an alcohol having a carbon chain length of 1 to 12 carbon atoms, preferably 5 or 6 carbon atoms;
(e) for the reaction to be effected at 50° to 70° C.;
(f) for the liquid phase, in the second reaction stage, to be mixed with a further quantity of alkali metal hydroxide solution sufficient to provide a molar ratio of total alkali metal hydroxide to phosphorus of about 1.2:1; and
(g) for the reactants to be introduced, in the first reaction stage, at a rate compatible with an average throughput of 50 to 150 g of phosphorus per hour per liter of reaction mixture.

The liquid phase material delivered from the first to the second reaction stage still contains, in typical cases, unreacted phosphorus amounting to about 10 weight % of the phosphorus introduced in the first reaction stage about 90 percent by weight of the phosphorus being reacted in the first stage. This unreacted phosphorus can be quantitatively reacted upon a further quantity of alkali metal hydroxide being added thereto, in the second reaction stage.

In order to effect such quantitative reaction, it is appropriate to use the alkali metal hydroxide in a total quantity greater than that which would correspond to a molar ratio of alkali metal hydroxide to phosphorus of 0.9:1; the total quantity preferably provides a molar ratio of about 1.2:1, as indicated earlier.

The excess of alkali metal hydroxide used in the second reaction stage does not critically influence the present process, but it is desirable for the total alkali metal hydroxide used to be limited to quantities which do not effect the commercial attractiveness of the present process.

In marked contrast with the geseous product produced in the first reaction stage, the gaseous products obtained in the second reaction stage contain $PH_3$ and $H_2$ in significantly varying proportions; more specifically they may contain in typical cases 10 to 70% by volume of $PH_3$, with an average of 20 to 30% by volume of $PH_3$. Their content of phosphine represents, in preferred cases, about 10% of the total phosphine generated from the phosphorus used.

The mixtures containing phosphine and hydrogen obtained in the second reaction stage may be used in reactions in which phosphine readily participates, e.g. for absorption in a formalin solution in hydrochloric acid for making tetrakishydroxymethyl phosphonium chloride or the like. It is also possible to resort to the combustion of the said mixtures and to absorb the resulting $P_2O_5$ in water, for example.

The alcohol which is used in the present process is not required to have a considerable dissolving power for phosphorus, sodium hydroxide solution, and the resulting salts, inasmuch as it is primarily intended to serve as a reaction-inducing agent and as a suspension medium for the starting materials and reaction products.

The quantity of alcohol used is sufficient if the suspension of the resulting salts is readily stirrable. This is usually the case if 100 ml of alcohol is used per mol of phosphorus. Inasmuch as the alcohol is recovered, any desired quantities may be employed, with the reservation that relatively large quantities of alcohol are inadvisable for economic reasons since they require the use of correspondingly larger vessels and since correspondingly larger volumes of material are then required to be heated, cooled and conveyed.

It is good practice to effect the reaction with the use of a commercial 50% aqueous alkali metal hydroxide solution. If a dilute solution is used, more water goes into the system and the salts formed are liable to agglomerate, which is undesirable. If less water is used, the phosphine concentration is but slightly improved. The proportion of alcohol in the alkali metal hydroxide solution does not appreciably affect the quality of the resulting gas. No reaction whatsoever occurs with the yellow phosphorus, however, if an anhydrous alcoholic alkali metal hydroxide is employed.

The following Examples illustrate the invention.

EXAMPLE 1: (Prior art)

A 2.5 liter double jacket glass reactor, provided with an agitator, thermometer, nitrogen scavenger, dropping funnel for sodium hydroxide solution, reaction gas outlet, and a bottom outlet for reaction solution, was fed with 2000 ml of n-hexanol and 100 g of yellow phosphorus, which were carefully scavenged with nitrogen.

After the desired temperature of 60° C. had been reached, the whole was admixed dropwise within 2 hours, and with thorough agitation (about 500 rmp), with 176 ml of a 50% aqueous sodium hydroxide solution. Gas began to be evolved immediately after the dropwise addition of the sodium hydroxide solution. The gas evolved was passed through a shallow active carbon layer (150 ml), and thence, to determine its concentration by volume of phosphine, to a "Uras II" ultrared absorption meter (a product of Hartmann and Braun, Frankfurt/M.). Next, the quantity of gas evolved was determined by means of a gas meter, and the gas was condensed at −120° C.

The results obtained are indicated in the following Table:

| Time (min) | Normal liters of gas (S.T.P.) | % by volume $PH_3$ |
|---|---|---|
| 3 | 1 | 4.5 |
| 5 | 2 | 12.0 |
| 7 | 3 | 24.0 |
| 11 | 5 | 51.5 |
| 21 | 10 | 79.0 |
| 30 | 15 | 84.0 |
| 40 | 20 | 82.0 |
| 51 | 25 | 72.0 |
| 62 | 30 | 50.0 |
| 75 | 35 | 27.0 |
| 125 | 40 | 8.0 |

The solution was found to become considerably lighter in colour towards the end of the reaction. The evolution of gas and concentration of $PH_3$ decreased significantly. The reaction was regarded as terminated as soon as less than 2 liters of gas were found to be evolved within 30 minutes.

The 40 liters of gas evolved contained 21.5 liters of $PH_3$. This corresponded to an average phosphine concentration of about 54% by volume; however, the phosphine concentration varied from a value less than 10% by volume up to approximately 85% by volume of $PH_3$. About 30% of the phosphorus used underwent conversion to phosphine. The salts formed contained hypophosphite and phosphite in a molar ratio of $P^{1+} : P^{3+} = 0.6:1$.

EXAMPLE 2: (Prior art)

950 ml of methanol and 100 g of yellow phosphorus were placed in the apparatus of Example 1 and heated to 60° C. while scavenging with nitrogen. Altogether 127 ml of a 50% aqueous NaOH solution was added dropwise within 60 minutes. The gas was evolved as follows:

| Time (min) | Normal liters of gas | % by volume $PH_3$ |
|---|---|---|
| 5 | 2 | 21.0 |
| 11 | 5 | 67.3 |
| 24 | 10 | 86.5 |
| 36 | 15 | 89.0 |
| 50 | 20 | 81.7 |
| 66 | 25 | 66.8 |
| 91 | 30 | 19.2 |

200 ml of water was added to dissolve the suspended salts which were obtained in a molar ratio of $P^{1+} : P^{3+} = 0.51:1$.

The methanol was recovered by distillation.

EXAMPLE 3: (Invention)

A 2.5 liter double jacket glass reactor, provided with an agitator, thermometer, nitrogen scavenger, heated phosphorus inlet, heated inlet for sodium hydroxide solution, alcohol inlet, reaction gas outlet, and a bottom outlet for reaction solution, was charged with 100 ml of n-hexanol. The agitator was adjusted to produce a satisfactory stirring effect. Next, the material was heated to 70° C., and 82 ml per hour of yellow phosphorus and 144 ml per hour of aqueous NaOH of 65% strength, which came from heated reservoirs (70° C.), were conveyed by means of a heated membrane pump through heated conduits and metered concurrently and continuously into the above reactor. After about 80 minutes, 681 ml per hour of n-hexanol was additionally introduced into the reactor by means of a hose pump. Gas began to be evolved immediately after the metered addition of phosphorus and sodium hydroxide solution. The resulting gas was metered and collected as described in Example 1.

The test results obtained are indicated in the following Table:

| Time (min) | Normal liters of gas | % by volume $PH_3$ |
|---|---|---|
| 3 | 2 | 15 |
| 6 | 4 | 48 |
| 16 | 10 | 74 |
| 25 | 16.5 | 88 |
| 30 | 20 | 91 |
| 40 | 27 | 94 |
| 60 | 40 | 95 |
| 120 | 80 | 95 |
| 180 | 120 | 95 |
| 240 | 160 | 95 |

The dark brown liquid phase obtained in this first reaction stage was a suspension of salts (sodium hypophosphite and sodium phosphite) in the alcohol, in which they were substantially insoluble; the suspension also contained residual finely divided unreacted phosphorus together with a minor proportion of free sodium hydroxide solution.

This liquid phase was introduced portionwise into a second reaction stage, for which use was made of a 750 ml double-jacketed reactor provided with an agitator, thermometer, nitrogen scavenger, heated inlet for sodium hydroxide solution, gas outlet, water dropping funnel and bottom outlet.

350 ml of liquid phase was delivered over a period of about 20 minutes to the second reaction stage, and heated to 90° C. Next, 15 ml of aqueous NaOH of 65% strength was added with thorough agitation. The composition of the gas obtained in the second reaction stage is indicated in the following Table:

| Time (min) | Normal liters of gas | % by volume $PH_3$ |
|---|---|---|
| 1 | 0.3 | 18 |
| 3 | 0.8 | 48 |
| 5 | 1.3 | 76 |
| 7 | 1.9 | 42 |
| 10 | 2.1 | 27 |
| 12 | 2.3 | 12 |

The reaction was complete after 10 to 15 minutes. The evolution of gas and concentration of $PH_3$ decreased considerably. The initially dark brown solution became colourless except for a slight yellow tinge. The suspended salts were granular, sandy and slightly yellowish. 175 ml of water was added, and the salts were dissolved completely. The fully reacted solution was poured into a container in which the salt phase was separated from the alcoholic phase. The alcohol was used again. The salt solution contained hypophosphite and phosphite in a molar ratio of 1.0 $P^{1+}$ : 1.1 $P^{3+}$ and in a concentration corresponding to about 11% of the total quantity of phosphorus used.

EXAMPLE 4: (Invention)

A gas stream comprising a high concentration of phosphine was produced continuously in a cascade reactor system comprising a 50 liter double-jacketted main reactor, a 20 liter double-jacketted post-reactor, a 15 liter dissolution vessel and a 100 liter separating vessel which were all series-connected together. By means of heated conduits, the main reactor was supplied with 3.3 kg per hour of yellow phosphorus, 4.6 kg per hour of NaOH of 70% strength and 24 liters per hour of amyl alcohol, and the whole was reacted at 70° C. with vigorous agitation and cooling.

A gas stream comprising 94% phosphine, the balance being hydrogen, was produced continuously at a rate of 720 normal liters of gas per hour, in the main reactor. The suspension of the salts formed (sodium hypophosphite and sodium phosphite) in alcohol, together with unreacted phosphorus, was continuously removed through a bottom outlet valve, which was actuated so as to be fully opened at short intervals.

To ensure complete reaction of the residual phosphorus in the post-reactor, a further 0.6 kg per hour of NaOH of 70% strength was added with vigorous agitation and while heating. The resulting gas (350 normal liters per hour) was strongly diluted with hydrogen (20% of $PH_3$ and 80% of $H_2$). The suspension of the salts in the alcohol, which was now free from unreacted phosphorus, was taken from the post-reactor, again by timed actuation of a bottom outlet valve. 15 liters per hour of water was introduced into the dissolution vessel in which the salts were dissolved.

In the separating vessel, there separated two phases which were immiscible with one another, namely alcohol and a concentrated aqueous solution of sodium hypophosphite and sodium phosphite. This salt solution, obtained at a rate of 22 kg per hour, contained altogether 10% of combined phosphorus in the ratio of $P^{1+} : P^{3+} = 0.5:1$. The alcohol was used again.

We claim:

1. In the process for the continuous production of phosphine by reacting elemental yellow phosphorus with a concentrated aqueous alkali metal hydroxide solution in the presence of an alcohol, with the exclusion of oxygen, at 44° to 90° C., the phosphorus and alkali metal hydroxide solution being introduced separately from one another into a reaction zone, the improvement which comprises effecting the reaction in two separate reaction steps A and B by reacting in step A the alkali metal hydroxide solution and about 90 percent by weight of the phosphorus with agitation in a molar ratio of 0.7 : 1 to 0.9 : 1, with the resulting formation of pure gaseous phosphine which is collected; delivering from step A, simultaneously the remaining liquid phase material containing the rest of the unreacted phosphorus to step B and there reacting said unreacted phosphorus with further aqueous alkali metal hydroxide solution and collecting the resulting gaseous reaction products separately from the pure gaseous phosphine collected in step A.

2. The process as claimed in claim 1, wherein 100 to 2000 ml of alcohol is used per mol of phosphorus.

3. The process as claimed in claim 1, wherein the aqueous alkali metal hydroxide solution used has a concentration of 50 to 80 weight %.

4. The process as claimed in claim 1, wherein the aqueous alkali metal hydroxide solution used in an alcoholic aqueous alkali metal hydroxide solution containing 0.5 to 2.2 mols of water per mol of alkali metal hydroxide.

5. The process as claimed in claim 1, wherein the alcohol used is an alcohol having a carbon chain length of 1 to 12 carbon atoms.

6. The process as claimed in claim 5, wherein the alcohol used is an alcohol having a carbon chain length of 5 or 6 carbon atoms.

7. The process as claimed in claim 1, wherein the reaction is effected at 50° to 70° C.

8. The process as claimed in claim 1, wherein, in step B, the liquid phase is mixed with a further quantity of alkali metal hydroxide solution sufficient to provide a molar ratio of total alkali metal hydroxide to phosphorus of about 1.2 : 1.

9. The process as claimed in claim 1, wherein the reactants are introduced into step A at a rate compatible with an average throughput of 50 to 150 g of phosphorus per hour per liter of reaction mixture.

* * * * *